Jan. 16, 1945.  T. O. KOSATKA  2,367,403
FLUID SEAL
Filed July 21, 1942
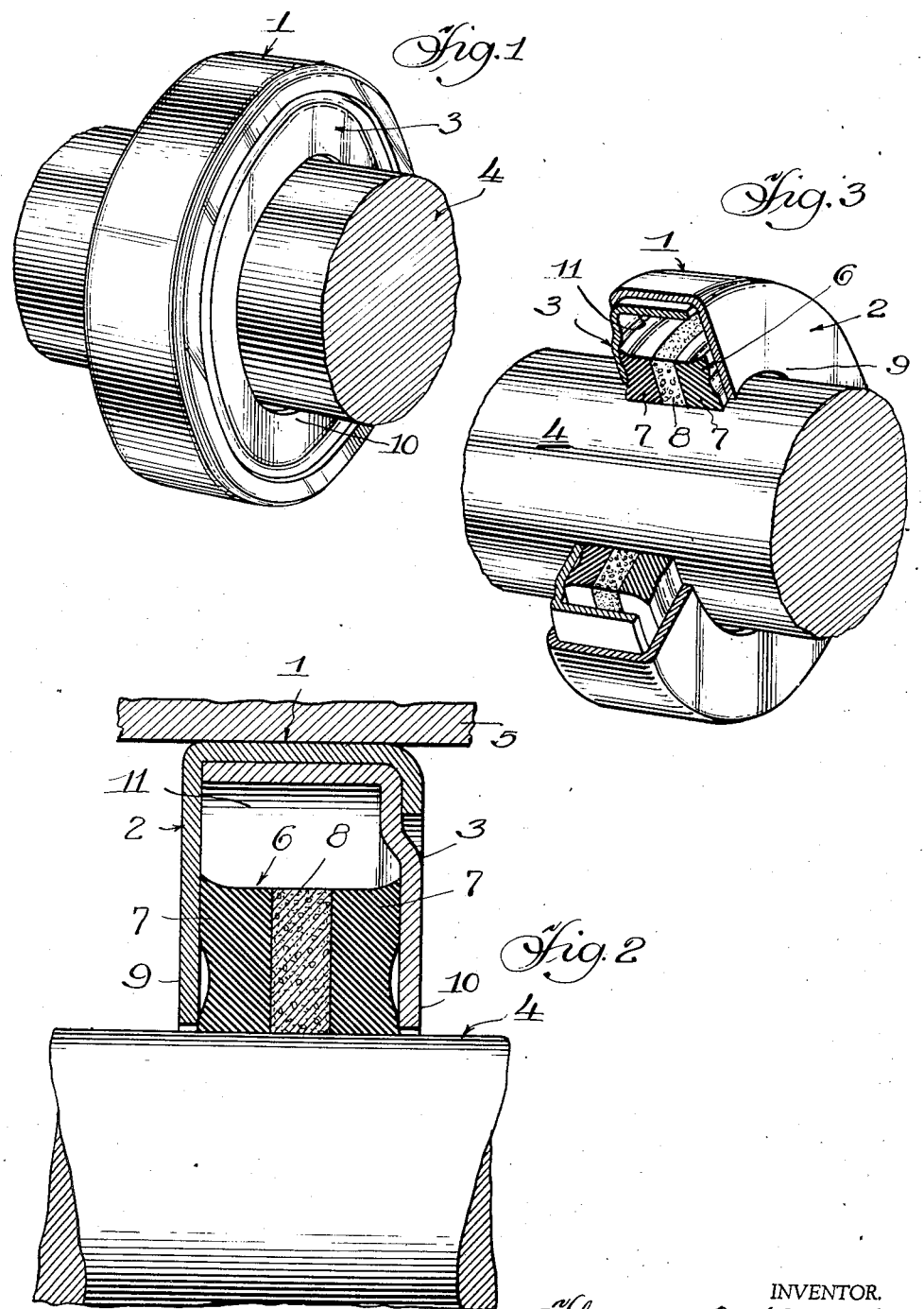
INVENTOR.
Thomas O. Kosatka
BY Parkinson & Lane
Attys Patented Jan. 16, 1945

2,367,403

UNITED STATES PATENT OFFICE 2,367,403

FLUID SEAL

Thomas O. Kosatka, Chicago, Ill., assignor to Victor Manufacturing & Gasket Company, Chicago, Ill., a corporation of Illinois Application July 21, 1942, Serial No. 451,724

3 Claims. (Cl. 288—3)

The present invention relates to fluid seals and more especially to a laterally expanding seal of the type adapted to seal the space between a rotatable shaft and its surrounding housing against the passage of lubricants, water and other cooling and industrial fluids, and to prevent the entrance of dust and other foreign particles. The present novel seal is so constructed and arranged as to compensate for eccentricities and misalignments between the shaft and its housing.

In the disclosed embodiment, the novel assembly consists of an enclosing shell or casing adapted to be mounted within the housing and secured or anchored upon the inner circumference thereof, and a composite sealing member secured by a press fit upon the shaft and having a continuous sealing contact with the inner side walls of the shell or casing whereby to secure most effective sealing under any and all conditions encountered in use.

The invention further comprehends a novel sealing member in which the sealing faces of the sealing elements are maintained in continuous sealing and wiping contact with the opposite radially extending walls of an enclosing shell or casing and thereby most effectively seal the space between a pair of relatively rotatable members, such as a rotatable shaft and its surorunding housing.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel fluid seal surrounding a shaft.

Figure 2 is an enlarged view in vertical cross section of the novel seal and showing its assembly upon the shaft and surrounding housing.

Figure 3 is a view similar to Figure 1 but with the position of the seal reversed and a portion broken away to more clearly show the inner construction.

Referring more particularly to the disclosure in the drawing, the novel fluid seal comprises an enclosing shell or housing 1 formed of interlocking or interengaging angular sections 2 and 3 which when assembled provide an annular, inwardly opening channel-shaped enclosure for the sealing member. This shell is provided with a centrally disposed opening for the reception of and through which is passed a rotatable shaft 4. The outer periphery or cylindrical surface of the shell is adapted to be securely mounted within the internal wall of a housing 5 surrounding the shaft, with the disclosed novel assembly adapted to effectively seal the space between the shaft 4 and the housing 5.

Mounted upon the shaft 4 by pressed fit is a sealing member 6 composed of spaced resilient sealing elements 7, 7 and an intermediate highly resilient member 8 adapted to continuously expand and force the sealing elements 7, 7 into wiping and sealing contact with the interior of the radially extending walls or flanges 9 and 10 of the encompassing shell. The sealing elements 7, 7 may be composed of any suitable friction resisting sealing or packing material having oil and other fluid resisting properties such as compounded synthetic rubber or the like. Also the element 8 is preferably of a compounded synthetic sponge-like rubber having greater resiliency than the sealing elements.

The novel composite sealing member will be maintained in sealing contact with the shell, regardless of whether the shaft is rotating or stationary and regardless of the eccentricity or misalignment of the shaft. As more clearly shown in Figure 2, the contacting faces of the sealing elements 7, 7 are interrupted so as to present spaced wiping and sealing surfaces to the inner surfaces of the side walls or flanges 9 and 10, and thereby provide a tortuous path for the passage of any oil or other fluids, dust, etc., tending to leak by the seal.

If desired, a suitable grease or lubricant may be packed or confined within the annular space 11 provided within the shell for maintaining the parts lubricated.

From the above description and the disclosure in the drawing, it will become apparent that the invention comprehends a novel construction of fluid seal in which the encompassing shell or casing and the sealing member rotate relative to each other, but in which sealing of the space between a rotatable shaft and its surrounding housing is most effectively maintained.

Having thus disclosed the invention, I claim:

1. A fluid seal for sealing the space between a rotatable shaft and its surrounding housing against the escape or passage of lubricants, water or other industrial fluids, dust, etc., comprising an inwardly opening channel-shaped enclosing shell adapted to be mounted in the surrounding housing with its spaced radially extending walls provided with an opening through which the shaft passes, a composite sealing ring in the housing having a bore dimensioned for press fit upon the shaft and rotatable therewith and consisting of a pair of radially extending, spaced sealing elements having wiping contact with the interior surfaces of the spaced radially extending walls of the shell and a co-extensive highly resilient sponge-like element under compression therebetween for forcing the sealing elements into continuous wiping and sealing contact with the walls.

2. A laterally expanded type fluid seal comprising an encompassing shell adapted to be securely mounted in an opening between a housing and a rotatable shaft, and having spaced radially extending flanges and a composite sealing member composed of three radially positioned layers of compounded synthetic rubber encompassing the shaft in edgewise relation and mounted by a continuous press fit upon the shaft, these layers being confined within the shell but rotatable relative thereto, the outer layers each having radially spaced sealing surfaces adapted to be maintained in continuous sealing and wiping contact with the radial flanges of the shell, and the inner of the layers being co-extensive with the outer sections and of highly resilient, sponge-like compounded synthetic rubber for applying a continuous expansive force against the sealing elements to maintain them in sealing contact with the flanges.

3. A fluid seal for sealing the space between a rotatable shaft and its surrounding housing, comprising an annular channel-shaped enclosing shell opening toward and encompassing the shaft, a composite sealing ring in the housing having a central bore for press fitting the ring upon the shaft and composed of a pair of radially disposed sealing elements having wiping contact with the interior surfaces of the opposite, spaced sides of the shell and a co-extensive highly resilient sponge-like element under compression therebetween for forcing the sealing elements into continuous wiping and sealing contact with the walls.

THOMAS O. KOSATKA.